(12) United States Patent
Latzke

(10) Patent No.: US 12,739,349 B2
(45) Date of Patent: Sep. 15, 2026

(54) SYSTEM FOR A CARE AREA, IN PARTICULAR A FITNESS STUDIO

(71) Applicant: ProLiving Systems AG, Amriswil (CH)

(72) Inventor: Gert Latzke, Lutzenberg AR (CH)

(73) Assignee: ProLiving Systems AG, Amriswil (CH)

( * ) Notice: Subject to any disclaimer, the term of this patent is extended or adjusted under 35 U.S.C. 154(b) by 0 days.

(21) Appl. No.: 18/647,188

(22) Filed: Apr. 26, 2024

(65) Prior Publication Data

US 2024/0364847 A1 Oct. 31, 2024

(30) Foreign Application Priority Data

Apr. 28, 2023 (DE) ..................... 10 2023 111 128.0

(51) Int. Cl.

| | |
|---|---|
| ***H04N 7/18*** | (2006.01) |
| ***G05B 19/042*** | (2006.01) |
| ***G06Q 50/10*** | (2012.01) |
| ***G06Q 50/163*** | (2024.01) |
| ***G06V 20/52*** | (2022.01) |
| ***G08B 21/02*** | (2006.01) |
| ***G08B 21/04*** | (2006.01) |

(Continued)

(52) U.S. Cl.

CPC ........... *H04N 7/183* (2013.01); *G05B 19/042* (2013.01); *G06V 20/52* (2022.01); *G08B 21/02* (2013.01); *G08B 25/12* (2013.01); *G05B 2219/25011* (2013.01); *H04N 5/76* (2013.01)

(58) Field of Classification Search

None

See application file for complete search history.

(56) References Cited

U.S. PATENT DOCUMENTS

2007/0033069 A1 2/2007 Rao et al.
2015/0279187 A1* 10/2015 Kranz ................ G08B 21/0415 340/539.12
2018/0280782 A1 10/2018 Lagree et al.

(Continued)

FOREIGN PATENT DOCUMENTS

CN 108416945 A 8/2018
CN 208076948 U 11/2018

(Continued)

OTHER PUBLICATIONS

7 Types of Gym Security Options. In: The.Rx Review, article from Mar. 1, 2023 [Onlinel https://www.therxreview.com/7-types-of-gym-security-optional [archived in https://web.archive.org/web/20230530213446/https://www.therxreview.com/7'-types-of-gym-security-optional on May 30, 2023] (available expertise).

(Continued)

*Primary Examiner* — Hung Q Dang

(74) *Attorney, Agent, or Firm* — Bachman & LaPointe, P.C.

(57) ABSTRACT

The present invention relates to a system for a care area, in particular a fitness studio for operation during opening hours with low user frequency and/or in the absence of support personnel, wherein a remote support center is set up from which a support person controls and monitors the fitness studios and/or other fitness studios and supports the persons present in their activities in the fitness studios.

9 Claims, 1 Drawing Sheet

(51) Int. Cl.
*G08B 25/12* (2006.01)
*H04N 5/76* (2006.01)

(56) References Cited

U.S. PATENT DOCUMENTS

| | | | | |
|---|---|---|---|---|
| 2018/0342329 | A1 | 11/2018 | Rufo et al. | |
| 2019/0199610 | A1* | 6/2019 | Kuenzi | H04L 43/06 |
| 2019/0295207 | A1 | 9/2019 | Day et al. | |
| 2021/0258387 | A1* | 8/2021 | Cosserat | H04W 4/70 |
| 2023/0071274 | A1* | 3/2023 | Trehan | G06T 13/40 |

FOREIGN PATENT DOCUMENTS

| | | | | |
|---|---|---|---|---|
| CN | 112330875 | A * | 2/2021 | G06Q 20/321 |
| CN | 115171277 | A | 10/2022 | |
| DE | 102020129804 | A1 | 6/2021 | |
| JP | 2022183642 | A | 12/2022 | |
| KR | 20170123427 | A | 11/2017 | |
| KR | 1020170123427 | A | 11/2017 | |
| KR | 20200008700 | A | 1/2020 | |

OTHER PUBLICATIONS

The only 24/7 gym access system giving total control over who visits and when. In:Gymmaster.com [Online] https://www.gymmaster.com/gym-access-control/[archived in https://web.archive.org/web/20201001130519/https://www.gymmaster.com/gym-access-control/ on Oct. 1, 2020].

Remote Services. In: Wikipedia the free encyclopedia. As of: Mar. 22, 2019 [Online] httos //en wikipedia oro/wJndex Dho*title-Remote Service&oldirl=186812186 (prosentea expertise).

Control Center Solutione. In: Wikipedia der freien EnzyNopsdie, Stand: Mar. 13, 2023 (Online] tdtos://en wikipedia oro/rv/\ndeX Dho? title=Control_Center_Solutions&oldid=231781729 (present expertise).

Office Action dated Dec. 12, 2023, issued in corresponding application DE 10 2023 111 128.0.

Extended European Search Report dated Sep. 30, 2024, issued in corresponding application EP 24172606.6.

* cited by examiner

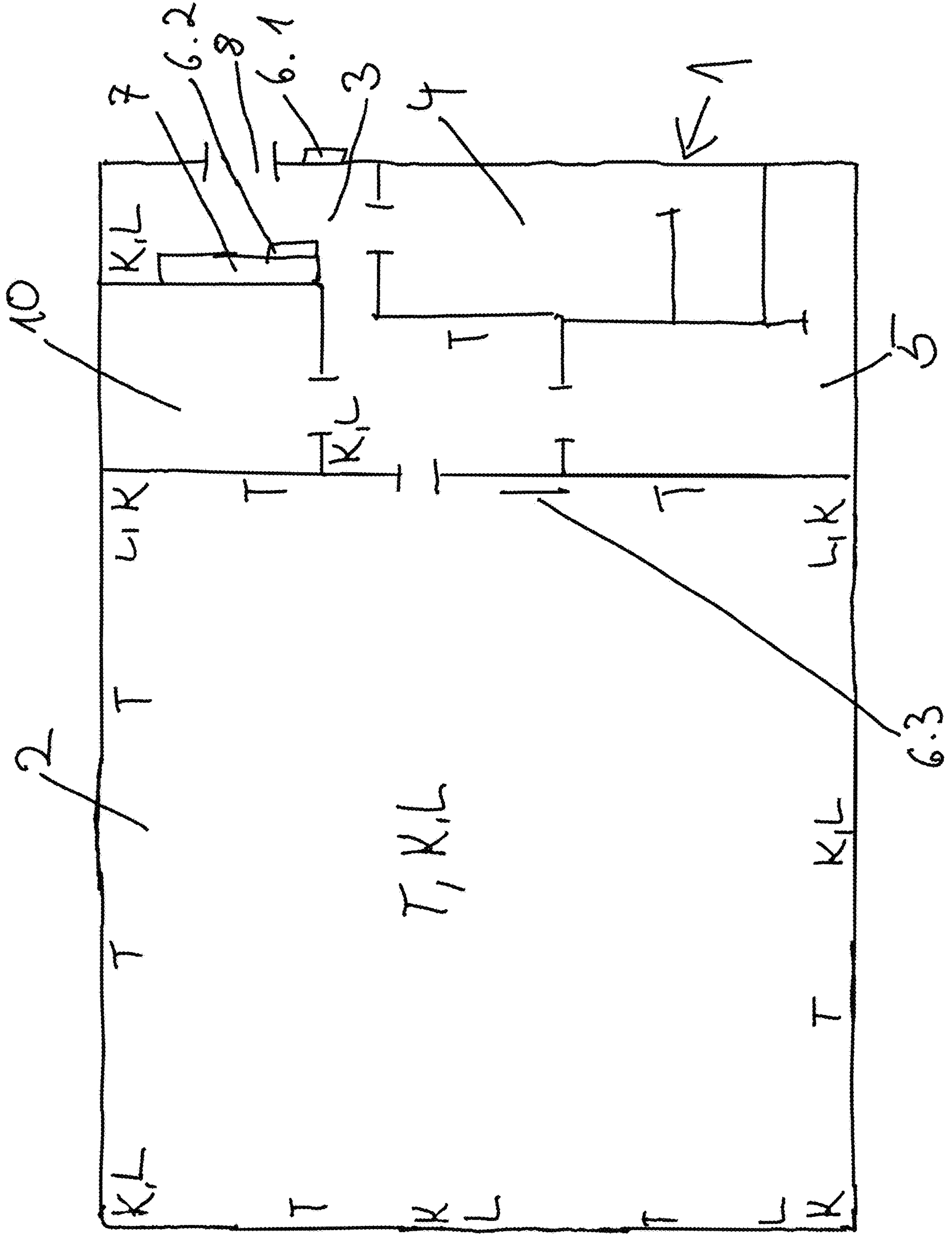
1
2
3
4
5
6.1
6.2
6.3
7
8
10
T, K, L

SYSTEM FOR A CARE AREA, IN PARTICULAR A FITNESS STUDIO

TECHNICAL FIELD

The invention relates to a system for a care area, in particular a fitness studio.

STATE OF THE ART

Such systems for fitness studios are already known and used in a variety of forms and designs. There are numerous designs of fitness studios, ranging from privately run and individually equipped small fitness studios to large fitness studio chains with the same training equipment, the same design and the same personal training support and supervision by employed staff at numerous locations.

Interest in fitness studios has been growing for years. More and more people are taking advantage of fitness studio offers. At the same time, the demands that users place on gyms are increasing, for example in terms of availability, equipment, opening hours and support.

In this context, the GymMaster gatekeeper system, for example, is mentioned, which allows access to a gym by means of an RFID chip and also records the entry and exit of customers in software that the gym operator can access online.

Reference is also made to KR 10 2017 0 123 427 A, which relates to a smart center management system, the system comprising a beacon installed at at least one position within a gym to communicate with a personal user terminal.

Reference is also made to US 2007/0033069 A1. This discloses a system comprising a data terminal operatively coupled to a training device. The data terminal is configured to receive fitness information associated with a fitness member from the training device. Additionally, a personal digital assistant is provided that is wirelessly connected to the data terminal via a network, wherein the data terminal is configured to transmit a message to the personal digital assistant based on the fitness information, which in turn can be accessed by a fitness instructor and can also communicate with the fitness member via the digital assistant, wherein the digital assistant is a smartphone or the like or specialized input devices in the gym.

Reference is also made to the remote services and control center solutions that have now become commonplace.

As a result, the competitive situation has also become much tougher. This is due, among other things, to the increase in competitors active on the market, rising personnel costs, rising operating costs, but also to the market-related fall in the average subscription fees to be paid for the use of a fitness studio.

Furthermore, gym users are showing a demand for longer gym opening hours. This applies to opening hours in the early hours of the morning, but also at lunchtime or late in the evening and into the night.

The availability and high personnel costs of staff are particularly problematic, especially in the early morning and late evening and night opening hours, which are to be extended and are generally only lightly frequented.

The costs of operating a fitness studio for 20 to 24 hours a day can hardly or not at all be managed under the above-mentioned competitive conditions without compromising the level of care or other areas such as quality, the recognition of emergency situations or the availability of sports equipment.

SUMMARY OF THE INVENTION

The task of the present invention is to overcome the disadvantages of the prior art. A fitness studio is to be provided in which the tasks of one or more fitness trainers otherwise present on site in the fitness studio are taken over and replaced, in particular during low-frequency opening hours, such as early morning, midday or late evening and at night, but also during normal operation, so that the desired extended opening hours can be made possible from a competitive point of view. There should be no disadvantages in the support service for the respective gym users.

The features disclosed herein lead to the solution of the problem.

Advantageous embodiments are also described herein and in the subclaims.

The present invention relates to a system for care area, especially a fitness studio for operation in the absence of support staff and/or for supporting support staff. The care area can be a fitness studio, as described in detail here. However, it is also possible and explicitly included that it can be a self-service checkout area, for example. In addition, other outdoor or indoor areas of use are also possible as care areas.

This can be during opening hours with low user frequency, but also during normal operation and/or in the absence of on-site support staff in the fitness studio.

The system for fitness studios according to the invention is characterized by the fact that they are connected to a remote support center via the Internet. From such a remote support center, a support person (hereinafter referred to as a live coach) is able to control and monitor the fitness studio and/or other fitness studios and to support the persons present in their activities in the fitness studio or other fitness studios.

According to the system according to the invention, each fitness studio is connected to a remote support center. The remote support center is preferably set up in a separate room. This room can be adjacent to a fitness studio or integrated into it, but can also be provided at a completely different location.

A remote support center can support numerous gyms, whereby support means control, monitoring and communication with the users.

It is essential that the remote support center is always connected to the gyms via the Internet.

The remote support center is manned by a support person, the so-called live coach, particularly during low-traffic opening hours, but also during normal operation and/or when support staff are absent from the gyms.

Of course, the remote support center can also be manned when a trainer is physically present in the gym. In these cases, the remote support center with the live coach provides additional support.

A live coach is a trained specialist for a fitness studio, for example a fitness trainer or a sports and fitness manager who is familiar with the management of a fitness studio and a corresponding remote support center.

Persons present or users means persons who train in the gym or are advised and supported by a live coach in a remote support center in connection with a membership to be concluded or terminated, a health check or other formal or training-related issues.

All gyms are connected to each other over the Internet via their respective remote support centers.

The gyms' remote support center contains three areas. These three areas are a monitoring area, a control area and a communication area. All three areas are operated and controlled by the live coach in the remote support center using software and corresponding hardware.

The hardware in the remote support center includes screens, computers, keyboards, computer mice, touchpads, loudspeakers, headphones, headsets, microphones and other hardware necessary and useful for data processing and communication. A workstation with a desk and a desk chair is normally placed in the remote support center.

For the first area, the monitoring area of the remote support center, there are screens, preferably an entire screen wall consisting of numerous screens, for example six, eight or more screens arranged next to each other on a wall. These screens are connected to video cameras in the gyms, whereby live video observations are made in all connected gyms and displayed on the screen wall in the remote support center(s). Each screen wall will show video feeds from a single gym, and multiple screen walls for multiple gyms may be located in a single remote support center.

The number and orientation of the video cameras in the gyms are positioned in such a way that every public area is covered. Numerous cameras are therefore arranged. The public area refers to the area in which the training equipment is located and in which training and advice is given to users. The changing areas and sanitary facilities, as well as areas that are only accessible to employees, are of course excluded from camera surveillance.

The cameras can be controlled by the Livecoach from the remote support center, i.e. they can be panned. There are also cameras that cannot be panned and only have a zoom function. The high-resolution video quality also allows the live coach in the remote support center to zoom in on individual areas, such as a user exercising on a training device, and display them in enlarged form. This allows him to quickly and easily recognize in the remote support center if a user is using the training device incorrectly or inappropriately for the intended individual training program, for example. The live coach can then intervene in a targeted, supportive and corrective manner via a loudspeaker announcement.

In addition, cameras with the following functions can be present, whereby motion detection and classification of persons is to take place, a video manipulation alarm is present, line crossing detection is integrated, intrusion detection is arranged, area entry detection and area exit detection to support alarm triggering by certain target types such as people is included, as well as scene change detection.

The cameras should also be able to record audio and upload data to NAS/memory card/FTP and cloud. It should also be possible to send a notification to a remote monitoring center. Recordings should be triggered automatically and sent by email to a remote support center or monitoring center. The cameras should also be able to emit acoustic warnings and have the ability to recognize faces. The cameras should also be able to swivel and rotate.

During live video surveillance, the software also automatically detects movement in the gym rooms. These movements are then visually marked and highlighted by the software when displayed on the screens in the remote support center. This makes it easier for the live coach in the remote support center to monitor the numerous screens and the camera images displayed there, as this identification immediately shows him which camera images he needs to focus on. This monitoring and control improves the overview of the live coach in the remote support center enormously and increases the quality of support in the fitness studios for the users.

If desired, the respective live video observations can be recorded and saved. This is used for quality control, helps to better solve problems identified during debriefings in the future and to document emergency situations, but also to better train trainees to work in a remote support center of the gym.

The second area, the control area of the remote support center, allows the live coach in the fitness studio on site, but also in the other fitness studios, to enable or block access at the entrance/exit for users and staff.

It is also planned that users and staff will be granted access to the fitness studio via an access authorization. Turnstiles, pedestrian barriers, automatic doors or similar are provided for this purpose. All standard access systems are also provided. For example, access by pin code, with chip cards, with key cards or chip wristbands etc.

However, optical keys, for example QR codes or barcodes, which are made available via an app, email or similar on a smartphone or tablet, are also possible as automatic access verification.

It may even be possible to provide access for a user via automatic facial recognition by means of a camera located at the entrance, whereby certain features of a user's face are automatically recognized, whereby access is then denied or refused.

The live coach in the remote support center is able to control and regulate all technical matters in the respective fitness studios via the control area and by means of the software, similar to a smart home system. This includes lighting, heating and air conditioning systems, ventilation, alarm and security systems, as well as door controls, garage access controls, elevator controls and ramp controls.

The training and spot devices can also be switched on and off via the control area. It may also be possible for the live coach to access and regulate the respective training and spot device controls. This allows the live coach, for example, to set an individual training program for the respective user and also to adjust it during training.

The control area also allows the control, regulation and monitoring of all other technical components of the respective fitness studio. This also includes the playing of music and live announcements. Announcements can also be played automatically and time-controlled. It is also possible, for example, to control roller shutters or blinds when the sun is at an unfavorable position and disturbing for users, whereby manual and automated conditions are also provided.

The Livecoach is able to access numerous other gyms via the control area, whereby it has the same communication, control and monitoring options. This makes it possible for a live coach to control and monitor several gyms at the same time from a remote support center and to support the users there.

The communication area is the third area of the gym's remote support center. The communication area allows the live coach to communicate in real time via video and audio with any user in one of the gyms.

Communication with the respective users is also facilitated by the fact that the software in the communication area shows the live coach which users are currently in which gym. The individual user profile of a user present in the gym is displayed to the live coach.

This individual user profile not only shows the live coach the presence of the respective user via the software in the remote support center, but the live coaches can also call up and enter further training-related and formal information about the user.

It may also be possible for physical data of the user during training, such as pulse or oxygen saturation, to be displayed to the live coach if they can be recorded by the training device. In addition, smart watches, fitness wristbands or similar worn directly on the user's body can also transmit this data to the remote support center if the user has allowed this.

In this way, every live coach in a remote support center is able to provide optimal support to every user at every location of a fitness studio and to react to the respective training status and the current training situation on site in the best possible supportive manner.

Of course, it is also possible for a user to access their individual profile themselves, whereby they can save or change a profile picture and, to a limited extent, also create entries, for example on their own training status.

It may also be possible for individual users to communicate with each other via this function. For example, to arrange a training session and then compare training successes.

It is also conceivable that a reward system is linked to the profile of each user, whereby, for example, rank levels are awarded for regular training or certain training successes, which can then be displayed in the profile.

The respective live coaches also have their own profile, which users can use to contact them and vice versa.

Communication between individual or several live coaches in the respective remote support centers of the fitness studios is of course also possible. This allows and simplifies organizational planning and agreements, but also the coordination of individual users and their individual training programs.

According to the system according to the invention, communication between the Livecoach and the user takes place via a communication terminal in the fitness studio. The communication terminal forms an important focal point in the system according to the invention.

The communication terminal is preferably designed as a stele approximately 2 m high and has a screen with touch function, loudspeakers, microphones and a camera. In this way, the respective live coach from the remote support center can switch directly to the screen when requested or required and communicate with the user via telephony or video telephony. According to the invention, this means, for example, that the communication terminal is set up to establish communication with a live coach.

The fact that the communication terminal is a stele approximately 2 m high also has the pleasant effect that the respective users of the fitness studio always have the impression that the live coach is virtually physically present.

In this way, the user's questions can be answered quickly and easily. These are not just questions about sports exercises or the like, but also simple or everyday questions such as how to set the heating, ventilation, lighting, access to the gym or even joining the gym.

To join the gym, for example, the live coach can project contract documents onto the prospective customer's screen, answer queries directly and also obtain the prospective customer's signature on a touchpad. This provides the prospective customer or user with all the necessary information at the communication terminal.

For example, the Livecoach can also be used as the gym's reception desk via the communication terminal. For this purpose, the communication terminal is located in an entrance area of the gym. Depending on the situation in the gym, the entrance area is defined either before and/or after an access point. If gym members are not admitted, for example, they can communicate with the live coach immediately and clarify any questions. However, it is also possible that someone does not have access because they are not yet a member of the gym. In this case, the live coach can let the person in for a trial day as they also have access.

Several communication terminals can also be arranged in the same gym or in several gyms, whereby several communication terminals are also connected to the same remote support center (10).

In addition, communication with the live coach can also take place via a user's private smartphone, tablet or other communication-capable device, such as a smart watch, a head-up display, a VR headset, VR glasses, an AR headset or AR glasses.

Furthermore, the live coach in the remote support center can also give instructions and/or instructions to one or more users via the speakers installed in the gyms.

For this purpose, numerous screens are arranged in the gyms on which the live coach can show himself to the users.

The live coach can control individual screens directly, for example by selecting the screen that is closest to a user with whom it wants to communicate.

It is intended that, if no other content is shown on the screens, the live coach is permanently displayed. This allows the user in the gym to recognize that a coach is always available. The live coach should also be visible on the screens if, for example, he is currently communicating with a specific user, whereby of course only the image can be seen, but not all screens also play back the sound of the individual conversation with the user.

In principle, however, all possible controls for the playback of sound and images should be possible, whereby all or only some or even just one screen can be controlled.

Of course, other content can also be displayed on the screens during the time when the responsible remote support center(s) is/are not occupied, such as information videos on the correct operation of the individual sports equipment, information on special events and opening times, or advertising and entertainment.

Communication terminals are also located in the fitness studios. Communication terminals are terminals that are used to communicate with a live coach and can replace a reception desk and a person there. Communication terminals are therefore preferably located in the entrance area, sometimes also in front of an entrance control of the gym, so that non-members can also interact with a live coach.

The communication terminals have a screen with touch function, loudspeakers, microphones and a camera. It is also possible for the communication terminals to be directly networked with the AR glasses/devices worn by the users and for communication to take place via these.

At these communication terminals, a user can communicate directly with a live coach in a remote support center, whereby they can handle all formal matters relating to a membership, but also health checks or other matters, such as registering for a trial training session. A user can also access their user profile at the communication terminals. It is also planned that cashless payment transactions will be possible at the communication terminals. It is also possible to sign contracts directly with users via the touchscreen of the communication terminal.

Furthermore, it is intended that users present in the fitness studios can read a QR code placed there using a smartphone, tablet or other corresponding device. This QR code is used to open a call function in a web app that does not need to be installed on the device used.

This call function allows the user to communicate with an available live coach in a remote support center. This can be done either via the respective user profile or without using a user profile.

Furthermore, several live coaches from different remote support centers can also be digitally present in the gym for the user, should this be desired.

Furthermore, the software, which displays the three areas mentioned above, the monitoring area, the control area and the communication area, in an application-oriented manner for the live coach and makes them operable, has additional functions.

The software has an emergency call function that can be used to contact and notify the fire department, emergency medical services, the police or other security services. This automatically ensures that the nearest emergency services and gym are contacted.

So-called emergency call buttons are also located in the gyms at several easily accessible positions where users can trigger an emergency call to the nearby security services and/or emergency services themselves. These alarm messages are of course also displayed to the live coaches in the remote support centers.

The software available to the live coaches in the remote support centers visualizes all the above-mentioned areas, the monitoring area, the control area and the communication area and allows intuitive operation and control of the individual processes.

The live coach is shown which other remote support centers of the fitness studios are online and which other live coaches are logged into the respective other remote support centers.

Of course, live coaches are also directly with the users in the fitness area near the sports equipment, especially at peak times in the gyms, and are there to provide direct support and guidance to the users.

Furthermore, the live coach in the remote support center is shown which communication terminals are online where, what is displayed on the screens in the fitness area of the selected gym and how many and which users and live coaches are checked in to which gyms, as it is recorded which users and live codes are in which gym.

Automatic and pre-programmed announcements are also stored in the software, which can be played over the loudspeakers by the live coach in a particular fitness studio as required and depending on the situation. This can be information, safety instructions or warnings, for example, but also information about upcoming closures.

In addition, the respective live coaches are shown which hardware, i.e. devices or other technical equipment in which gym are online and therefore controllable, as well as their current status.

For example, the software displays the status of the entrance doors in a particular gym, which lights are switched on and which lights are switched off and which other controllable devices and systems have which value or status.

The fact that the technical equipment in each gym can be controlled from any remote support center results in enormous savings potential, especially at times when only a few users visit the gym. In addition, user safety is guaranteed at all times.

Processes can also be simplified. But it also enables mutual monitoring by the live coaches responsible, so that errors and problems can be prevented or detected at an early stage.

As an additional safety device, in the event that the Internet should fail or no connection can be established between a remote support center and a fitness studio for other reasons, storage and software are stored in the fitness studios. These respective local memories and software allow full control and operation of the hardware, equipment, sports equipment and admission controls located in the gyms, including the playback of stored music playlists on site.

It is also possible for the remote support center to be a laptop, tablet or other mobile computer with a display device and the above-mentioned software, from which all the functions of a physically located remote support center can be performed.

It is also envisaged that the software of the remote support center can access personal data of users in the fitness studios by reading it from their devices via an interface and displaying it to the caregiver. This means that data from, for example, smartwatches, smartphones or similar devices worn by users during training in the gym can be retrieved.

It is also intended that such personal data can be retrieved from training and sports equipment, as well as from corresponding apps on corresponding devices.

This greatly improves the personalized training support provided to the user by the Livecoach.

It is clear that the model of the fitness studio with a remote support center can also be transferred to other similar facilities that are frequented by users. For example, it is conceivable that tanning salons, amusement arcades and casinos, the reception and front desk of hotels, self-storage, retail shop-in-shops (POS) or the gymnastics area of physiotherapy facilities could be controlled via a corresponding remote support center, with users also being supported by a live coach from the remote support center. The list of potential areas of application is almost endless.

BRIEF DESCRIPTION OF THE DRAWINGS

Further advantages, features and details of the invention can be seen from the following description of preferred embodiments and from the drawings, which show in:

FIG. 1 a schematic view of a fitness studio 1.

DETAILED DESCRIPTION

FIG. 1 shows a schematic diagram of a fitness studio 1 as an overview plan.

In this example, the fitness studio 1 has a training room 2. This training room 2 contains the training and sports equipment that is usually made available to users in a fitness studio.

There is also an entrance area 3. This entrance area 3 has an entrance/exit 8. Via the entrance area 3, users of the fitness studio 1 can access a women's changing room 4, a men's changing room 5, the training room 2 and live coaches can access a remote support center 10. There is also a reception area 7 with a reception desk in the entrance area.

In this example, the remote support center is physically attached to the gym.

Training room 5 has screens T, cameras K and loudspeakers L, which are distributed at different positions in training room 2.

In addition, communication terminals 6.1, 6.2, 6.3 are arranged in front of the entrance/exit 8, in the entrance area 3 and in the training room 2.

With reference to FIGS. 1, the functionality of the fitness studio 1 according to the invention is explained as follows:

The fitness studio 1 according to the invention makes it possible to provide full-quality operation for users, particularly during low-traffic opening hours, such as at night and early in the morning, as only a few live coaches need to be present in their respective remote support centers 10 to replace the trainers on site in the fitness studios.

For example, a live coach in a remote support center 10 at 3 a.m. is able to manage and operate several gyms 1 that are located at other sites. The software and hardware available to the live coach in the remote support center with the three areas, a monitoring area, a control area and a communication area allow him to operate the respective fitness studio, monitor the users and communicate with them and thus support them.

| List of reference symbols | |
|---|---|
| 1 | fitness studio |
| 2 | Training room |
| 3 | entrance area |
| K | camera |
| L | Loud speaker |
| T | Screen |
| 4 | Women's changing room |
| 5 | men's changing room |
| 6.1, 6.2, 6.3 | communication terminal |
| 7 | Reception area |
| 8 | Entrance/Exit |
| 10 | remote support center |

The invention claimed is:

1. System for operating a fitness studio, comprising:

a remote support center (10), from which a support person controls and monitors the fitness studio and/or other fitness studios and supports persons present in the fitness studios (1), the remote support center (10) having a monitoring area, a control area and a communication area, which are operated and controlled by means of software, wherein the monitoring area of the remote support center (10) has screens which are connected to video cameras (K) in the fitness studios, wherein live video observations are made in all connected fitness studios (1), wherein automatic detection of movement and optical identification and highlighting is displayed on the screens and wherein recording and storage of live video observations takes place as desired, wherein the control area of the remote supervision center (10) allows the supervisor to enable or block access for users and staff at an entrance/exit (8) in one or more of the studios (1), to control lighting, to control heating and air conditioning systems, to switch training equipment on and off, to play music, to control roller shutters, and to control and monitor all other technical components of a respective fitness studio, wherein the communication area enables real-time communication via image and sound between the caregiver in the remote care center and any user in one of the fitness studios (1) to be operated via at least one of a smartphone, tablet, VR devices, AR devices of a user and a communication terminal (6.1, 6.2, 6.3), wherein the fitness studios (1) to be operated are equipped with video cameras (K), loudspeakers (L), microphones, communication terminals (6.1, 6.2, 6.3), screens (T), lighting controls, door controls, heating and air conditioning controls, ventilation controls, and alarm and security systems, which are connected via Internet to the support center (10) and can be controlled remotely from there, wherein the communication terminal (6.1, 6.2, 6.3) is set up to establish communication with a live coach and at the same time serves as a reception and is arranged in an entrance area of the fitness studio, wherein the communication terminal (6.1, 6.2, 6.3) has a screen with touch function, loudspeakers, microphones and a camera, wherein several communication terminals (6.1, 6.2, 6.3) can be arranged in the same fitness studio or several fitness studios and are connected to the same remote support center (10), and wherein the communication terminal is configured to project contract documents onto the screen and to obtain a prospective customer's signature on the touchpad.

2. System according to claim 1, wherein the remote support center (10) is set up in a separate room of the fitness studio (1) or at another location.

3. System according to claim 1, wherein a person present in a respective fitness studio (1) uses a smartphone or a tablet to read out a QR code at the respective fitness studio in order to communicate with a caregiver in a remote care center (10) via a call function, whereby a web app is opened which does not have to be installed on the smartphone.

4. System according to claim 1, wherein an emergency call button is provided, which outputs alarm messages to emergency services and to the remote support center as well as an alarm tone via the loudspeakers, whereby an emergency message is also visualized on the screens in the fitness studio (1).

5. System according to claim 1, wherein the software of the caregiver in the remote care center (10) indicates how many and which other fitness studios (1) and which remote care centers (10) are online, how many and which users are in the respective fitness studios (1) and which hardware in the respective fitness studios (1) is online and operable.

6. System according to claim 1, wherein the monitoring area of the remote support center (10) has laptops and/or tablets and/or smartphones and/or VR devices and/or AR devices which are connected to the video cameras (K) in the fitness studios, whereby live video observations are made in all connected fitness studios (1), automatic detection of movement and optical identification and highlighting being displayed on the screens, and is recorded and saved.

7. System according to claim 1, wherein the remote care center (10) is a laptop, a tablet or another mobile computer with a display device and the software.

8. System according to claim 1, wherein the software of the remote care center (10) reads out access to personal data of users in the fitness studios by means of an interface from devices of the users and displays the personal data to the caregiver at the remote care center.

9. System according to claim 1, wherein the communication terminal is further configured to conduct a health check from a prospective customer.

* * * * *